(12) United States Patent
Manning et al.

(10) Patent No.: US 6,590,304 B1
(45) Date of Patent: Jul. 8, 2003

(54) ELECTRICAL PEAK LOAD DISTRIBUTOR

(75) Inventors: Michael L. Manning, Athens, GA (US); Frank Stembridge, East Point, GA (US)

(73) Assignee: Manning Tronics, Inc., Athens, GA (US)

( * ) Notice: Subject to any disclaimer, the term of this patent is extended or adjusted under 35 U.S.C. 154(b) by 0 days.

(21) Appl. No.: 09/548,979

(22) Filed: Apr. 14, 2000

Related U.S. Application Data (60) Provisional application No. 60/129,826, filed on Apr. 16, 1999.

(51) Int. Cl.$^7$ .................................................. H02J 1/00
(52) U.S. Cl. ......................... 307/131; 307/38; 307/39; 307/41
(58) Field of Search ..................... 307/131, 38–41

(56) References Cited

U.S. PATENT DOCUMENTS

| | | | |
|---|---|---|---|
| 4,066,913 A | | 1/1978 | Manning et al. |
| 4,163,271 A | | 7/1979 | Sturrock |
| 4,216,384 A | * | 8/1980 | Hurley .......................... 307/39 |
| 4,336,462 A | * | 6/1982 | Hedges et al. ................. 307/35 |
| 4,419,589 A | * | 12/1983 | Ross ............................. 307/39 |
| 4,421,992 A | * | 12/1983 | Hibbard et al. ................ 307/41 |
| 4,471,232 A | * | 9/1984 | Peddie et al. .................. 307/35 |
| 4,694,192 A | * | 9/1987 | Payne et al. ................... 307/39 |
| 4,695,738 A | * | 9/1987 | Wilmot ......................... 307/39 |
| 4,771,185 A | * | 9/1988 | Feron et al. ................... 307/39 |
| 5,436,510 A | * | 7/1995 | Gilbert ......................... 307/38 |
| 5,581,132 A | * | 12/1996 | Chadwick ..................... 307/39 |
| 6,252,311 B1 | * | 6/2001 | West ............................. 307/39 |

* cited by examiner

*Primary Examiner*—Fritz Fleming
(74) *Attorney, Agent, or Firm*—Hinkle & O'Bradovich, LLC (57) ABSTRACT

A method and apparatus for peak load distribution is disclosed. A peak load distributor reduces the demand on a power distribution system by controlling the power available to loads. The apparatus takes an AC current input and a micro-controller executes control algorithms to open and close power outputs to deferrable loads. The outputs are generally put in series with the power applied to a load to disable the load or to lower peak demand.

7 Claims, 6 Drawing Sheets

Fig_5

ELECTRICAL PEAK LOAD DISTRIBUTOR

CROSS-REFERENCE TO RELATED APPLICATIONS

This application claims the priority benefit of U.S. Provisional Application No. 60/129,826 filed Apr. 16, 1999, entitled "Electrical Peak Load Distributor".

BACKGROUND OF THE INVENTION

I. Field of the Invention

The present invention relates generally to the field of power distribution, and more particularly to a power distributor adapted to minimize peak power demand.

II. Description of the Related Art

There has been a trend towards greater use of electrical power not only in residence but also in commercial applications. Typically, in businesses, there are multiple users of large amounts of electrical power to operate various systems, and this creates an extremely large demand for power when two or more such systems are operated concurrently.

When there is a large demand for power, the company supplying the power must have sufficient power available to meet the maximum expected demand. This demand and expectation requires the company supplying the power to have the capacity to generate the power and meet the demand. Inefficiencies result because, typically, the electric generating company builds plant facilities that, for the majority of time, can very well exceed the electrical demand. Conversely, there are periods for several hours during a 24 hour period in which there is relatively little demand followed by relatively short periods in which there is exceptionally high demand. As a result, the large capacity of a power generating company is virtually wasted for long periods of time and is called into use for only short periods. Consequently, there is an excessive capital expenditure on the part of the electric generating company to be able to supply peak demand for electrical power.

There have been efforts to resolve the problem of peak demand for electrical power by the relatively simple solution of penalizing a user of electric power by increasing the charge for electrical power in accordance with the power demand, While such a system produces revenue with which the power company can provide the power to the system, it does nothing to prevent the building of overcapacity by the power company. Further, because of existing regulatory systems, power companies typically have little interest in reducing the level of power usage because the regulatory authorities allow the power companies to charge the ultimate end use for the cost of plant facilities to generate the expected demand of power. With the lack of incentive upon the power generating company to reduce the power demand, it falls upon the ultimate end user to do whatever that user can do to reduce the power utilized by the user. Systems have been devised wherein one monitors the total power used and selectively disconnects certain electrical loads on a priority basis when the demand reaches a predetermined level. When the demand decreases, various systems have been utilized for reconnecting loads on accordance with the priority of the loads. These prior art systems have taken the form of very complex systems, generally including some form of electronic data processing means for storing information, monitoring power use and making decisions based upon the stored information. Such systems are necessarily expensive and tend to be useable only in large groups of users or where large groups of power systems are utilized. For instance, in U.S. Pat. No. 4,066,913 to Manning et al, an electric load distributor is disclosed which operates by having a higher priority load disabling other loads having lower priority through the use of timers, thermostats, coils and switches on a somewhat mechanical basis. In U.S. Pat. No. 4,163,271 to Sturrock, an electric load distributor overcomes the difficulties of the prior art by providing a switching means which comprises a current sensing means for determining when a current is present and having switch means operable by the current sensing means to cancel loads at specific current-draw limits.

SUMMARY OF THE INVENTION

In accordance with the present invention and the contemplated problems which have and continue to exist in this field, the invention features a load distributor adapted to distribute the various electrical loads of a single power user.

In one aspect, the invention features a power distributor, including a current sensor having a load input and a sensor output, a control unit connected to the current sensor, the control unit including, a current sensor input connected to the sensor output, at least one control output adapted to respond to a current in the current sensor, a control switch connected to each of the at least one control output and a micro-controller having a memory, the micro-controller electrically coupled to the current sensor input and the at least one control output.

In one implementation, the micro-controller includes a timer and a timer switch.

In another implementation, the memory includes a non-timer process and a timer process, wherein the non-timer process comprises instructions to distribute power to the at least one output when a current in the current sensor exceeds a first threshold and cut power to the at least one output when the current in the current sensor drops below a second threshold and wherein the timer process comprises instructions to distribute power to the at least one output when a current in the current sensor exceeds a threshold for a first time interval and cut power to the at least one output if the current remains in excess of the threshold for a second time interval.

In another implementation, the current sensor is a current transformer.

In still another implementation, the current sensor includes an input adapted to receive a plurality of conductors, each of the plurality of conductors having a unique current level.

In yet another implementation, the timer is based on a line frequency.

In another aspect, the invention features a method of controlling power in a power distribution system, including providing a first load having a first current having a plurality of threshold values, providing a second load having a second current, monitoring the threshold values of the first current and based on the threshold values of the first current, selectively cutting off and redistributing the second current to the second load.

In an implementation, selectively cutting off and redistributing the second current includes distributing the second current to the second load when the first current exceeds a first threshold value and cutting the second current to the second load when the first current drops below a second threshold value.

In another implementation, the plurality of threshold values vary with time and selectively cutting off and redistributing the second current includes distributing the second current to the second load when the first current exceeds a threshold value for a first time interval and cutting the second current to the second load if the current remains in excess of the threshold value for a second time interval.

In another implementation, the method includes providing at least one additional load having an additional current and based on at least one of the threshold values of the first current and the second current, selectively cutting off and redistributing the additional current to the at least one additional load.

In still another aspect, the invention features an electric distribution system, including a plurality of circuits, each having a plurality of loads and a peak load distributor, including a current sensor having a load input and a sensor output; and a control unit electrically coupled to the current sensor.

In an implementation, the electric distribution system further includes a remote meter and communications module connected to the peak load distributor.

One advantage of the apparatus is that is provides a single microprocessor chip to execute control algorithms based on current amplitude and time to open and close output contacts to various priority loads. The output contacts are generally put in series with the power applied to a load to disable the load to lower the peak demand.

Another advantage is that the timing portion of the controller algorithm allows the controlled load to operate part of the time during peak demand periods.

A further advantage is that the system monitors electric loads wherein the completion or interruption of a circuit is determined by the level of current present or absent in a monitored load at different times of the day or night.

Other objects, advantages and capabilities of the invention will become apparent from the following description taken in conjunction with the accompanying drawings showing the preferred embodiment of the invention.

DETAILED DESCRIPTION OF THE INVENTION

Figure 1:
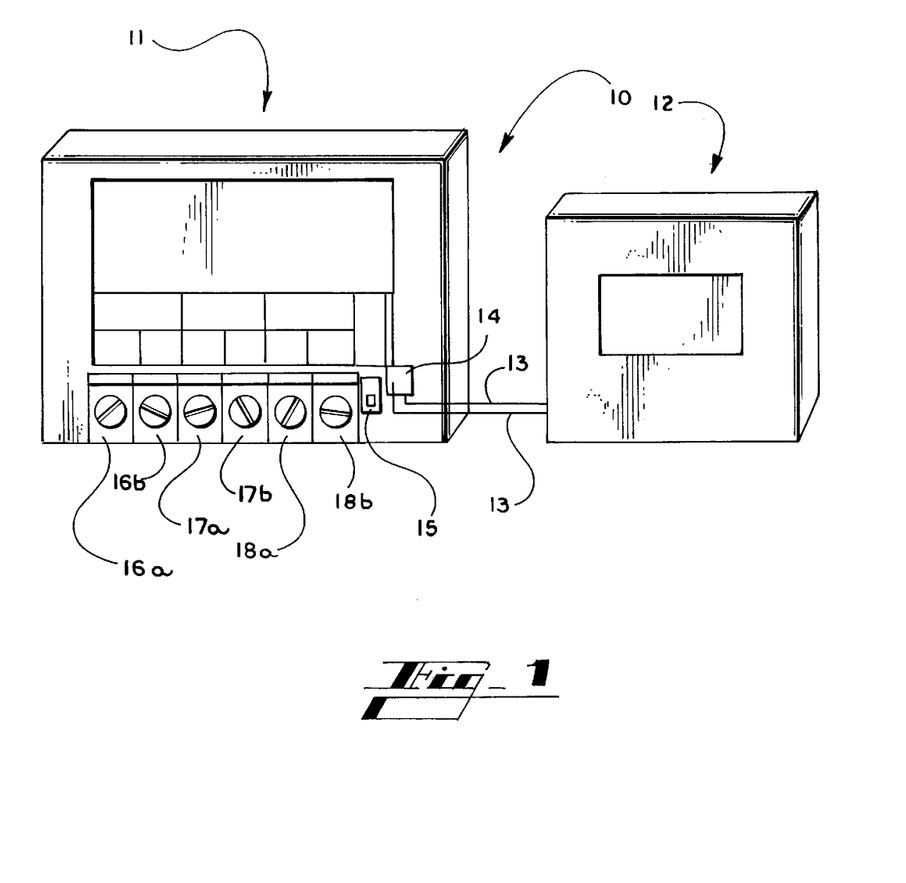
FIG. 1 shows an embodiment of a peak load distributor having control module and a current sensor.

Referring to the drawings wherein like reference numerals designate corresponding parts throughout the several figures, reference is made first to FIG. 1 which illustrates a peak load distributor (PLD) 10 having a control unit 11 connected to a current sensor 12 by electrical leads 13. The electrical leads 13 connect the coil wires of the current sensor 12 to the current sensor input plug 14 located on control unit 11. The current sensor 12 acts as a non-contact current sensor. A load to be monitored is connected to the current sensor 12. The current to be measured from the monitored load flows through the current sensor 12 and provides an output voltage across the leads 13 for input into the control unit 11. During peak power usage, several other loads can be connected to the control unit 11. By being connected to the control unit 11, the additional loads can be controlled and necessarily turned on or off depending on the current flowing through the current sensor 12. One load to be controlled can be connected across leads 17a, 17b, and an additional load can be connected across leads 18a, 18b. In another embodiment, the control unit includes additional load inputs adapted to control additional loads.

The control unit 11 is equipped with a timer (not shown). The operation of the timer is discussed in further detail below. A timer switch 15 is used to choose among control algorithms. In one embodiment, two control algorithms are used: a Timer Mode and a Non-Timer Mode. In this embodiment, the timer switch 15 is used to switch between the Timer Mode and the Non-timer Mode. If the switch 15 is in the non-timer position, output contacts 17a, 17b and 18a, 18b open when the sensed current exceeds a certain value and close when the sensed current falls below a specified value. When the switch is in the timer position, the controlled loads are cycled on and off when the sensed current is higher than a threshold. A detailed description of the two modes are discussed in detail below. In either mode, the controlled loads can be selectively turned on and off during peak load time periods.

Power input leads 16a, 16b are adapted to provide input power for the control unit 11. In one embodiment, the input power supplied to control unit 11 is specified between 100 and 130 VAC. and the input current range is specified between 0 and 100 Amps AC. The output contacts for the load A and load B contacts 17a, 17b and 18a, 18b respectively can have UL contact ratings:

| | |
|---|---|
| Inductive or Resistive: | 2–30 Amps @ 12–240 VAC |
| Motor: | 1 HP @ 120 VAC |
| Motor: | 2 HP @ 240 VAC |
| Tungsten: | 5 amps @ 240 VAC |
| Ballast: | 6 amps @ 277 VAC. |

These ratings are illustrative of the ratings that the output contacts 17a, 17b, 18a, 18b can have. In other embodiments, the UL contact ratings can have additional or different values.

In an implementation, the current measurements through the current sensor 12 have an accuracy of +/−0.5 amps, and the timing accuracy is based on the power line frequency and the output control timing is typically repeatable within +/−1 second. In a typical embodiment, the operating temperature is −20° C. and +70° C.

In an embodiment, the PLD control unit 11 is constructed on a single printed circuit board (PCB) that is housed in a plastic phenolic base plate. The case is attached to the PCB, and the PCB is coated for moisture resistance. The current sensor 12 is typically a current transformer having a plastic molded case with suitable number of turns in the coil for the measurements to be perfected in the embodiment.

In general, the PLD 10 reduces the demand on a power distribution system by controlling the power available to loads. The apparatus takes an AC current input and a micro-controller (discussed below) executes control algorithms to open and close power output contacts 17a, 17b, 18a, 18b to deferrable loads. The outputs 17a, 17b, 18a, 18b are generally put in series with the power applied to a load to disable the load or to lower peak demand. In an implementation, the monitored load may be an air conditioner in a home running during the summer. The two controlled loads can be a clothes dryer and a water heater. In such an implementation, a PLD 10 is useful to monitor the current drawn by the air conditioner. As more current is drawn during the hottest hours, it may be desirable to defer the power to the water heater and clothes dryer. As the demand for the power ceases in cooler hours, power is restored to the clothes dryer and water heater.

Figure 2:
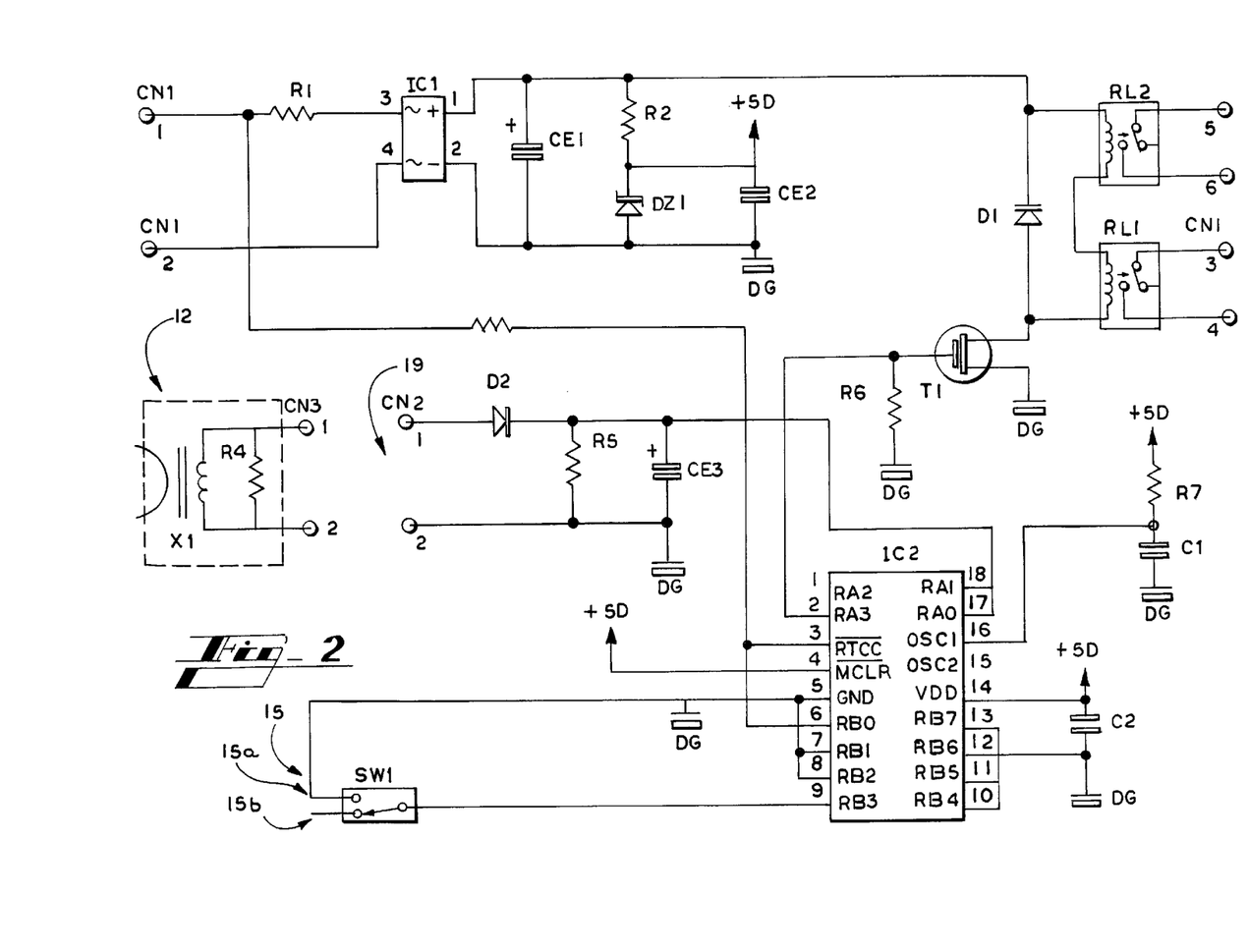
FIG. 2 is a schematic diagram of an embodiment of a control module and current sensor.

FIG. 2 is a schematic diagram of an embodiment of an electronic circuit used in the PLD 10 of FIG. 1. This schematic serves only as an example and one implementation of a circuit used for the current sensor 12 and control unit 11. In this embodiment, the current sensor 12 is a ferrite transformer X1 which is in the form of a pair of U cores. In an embodiment, a bobbin with 1000 turns of #34 magnet wire is placed over the legs of the U cores to couple the magnetic flux from the primary (input current) to the magnet wire coil. A resistor R4 is placed across the two wires of the secondary coil to provide a voltage output which is connected by a length of wire to CN3. In one implementation, the resistor R4 is 1 KΩ and the connecting wire is approximately 3 feet. CN3 connects to CN2 on the control unit 11, which corresponds to the input plug 14 in FIG. 1. The voltage output CN3 of the sensor is approximately 3.5 VAC for an input current of 5 amps.

The input power of 100 VAC–130 VAC is wired to terminals 1 and 2 of CN1 (16a, 16b in FIG. 1). A voltage dropping resistor R1 passes alternating current to a bridge rectifier IC1. A full wave rectified output of the bridge rectifier IC1 is filtered by a capacitor CE1. This DC voltage is applied directly to one side of a coil on an output relay RL2 and a cathode side of clamping diode D1. Output relays RL1 and RL2 have 24 V.C. coils, which are connected to form a 48 volt equivalent load. The clamping diode D1 is in parallel to the series combination of the coils of relays RL1, RL2. The clamping diode D1 shunts a reverse voltage induced when the relay RL1, RL2 coils are de-energized. A power metal-oxide-semiconductor field effect transistor (MOSFIT) T1 switches the current through the relay coils RL1, RL2 on and off as controlled by a single chip micro-controller IC2. The micro-controller IC2 is discussed in detail below. The voltage dropping resistor R1 limits the current through the relays RL1, RL2 coils when they are energized.

A low voltage power supply +5D is derived from the output of the bridge rectifier IC1 with a voltage dropping resistor R2 and a Zanier diode DZ1. A capacitor CE2 and the resistor R2 are a filter for the power supply +5D during power input fluctuations. A return current DG for the supply +5D is connected to the negative side 2 of the bridge rectifier IC1.

In one embodiment, IC2 is a low power general purpose programmable micro-controller which has twelve I/O pins, RA1, RA2, RA3, RA4, RB0, RB1, RB2, RB3, RB4, RB5, RB6, RB7, one counter pin RTCC, two oscillator pins OSC1, OSC2 connected to internal oscillator circuitry (not shown), a ground pin GND, a control voltage pin VDD and MCLR pin. The micro-controller IC2 includes internal reset and brown out protection circuitry (not shown), analog comparators (not shown) a programmable reference voltage. The micro-controller IC2 is used for comparison and control function as discussed below. The power supply +5D is connected to the VDD input and MCLR input to power the micro-controller IC2. A capacitor C2 is connected in parallel to the chip and provides short bursts of current during operation. A resistor R7 and a capacitor C1 form a simple RC network that is used as a timing network for the on-chip oscillator (not shown) connected to pin OSC1. In an implementation, a 10 KΩ resistor and a 100 pF capacitor produce approximately 600 kHz oscillator frequency. The actual frequency of the oscillator is not crucial to the operation of the micro-controller IC1 or the control unit 11, as all timing is based on the 60 Hz line frequency. The counter pin RTCC and I/O pin RB0 are connected together. The micro-controller IC2 has an internal diode protection network. The two pins RTCC and RB0 are connected together so that the diode protection network located on input RB0 clamps the AC sine wave to within six tenths of a volt if the digital power supply fails. A resistor R2 is connected between the two pins RTCC and RB0 to limit the current to the micro-controller IC2 from the line frequency source at CN1.

Pin RA3 of the micro-controller IC2 is connected to the gate of the power MOSFIT T1 which controls the output relays RL1, RL2. A resistor R6 keeps the MOSFIT T1 powered off when the micro-controller IC2 is not actively controlling its outputs during power up and down situations. Pin RB3 of the micro-controller IC2 has a passive internal pull-up resistor and is an input for a timer switch SW1 (15 in FIG. 1). Timer switch either pulls the RB3 pin to ground, or allows the internal pull-up resistor to input the voltage from the power supply +5D.

The AC voltage from the current sensor 12 comes through connector CN2, identified by numeral 19. A diode D2 rectifies the AC voltage input and a resistor R5 and capacitor CE3 filter the rectified signal. Pins RA1, RA0 of the micro-controller IC2 can be configured as analog inputs to two different comparators internal to the micro-controller IC2. One input to each comparators can be internally connected to the on-chip programmable reference voltage. The value of the reference voltage is varied under firmware control (discussed below) and is used to generate a hysteresis used for comparison. The analog input is connected to the inverting input of both comparators for layout convenience. The output contacts (17a, 17b in FIG. 1) of relay RL1 are connected directly to terminals 3 and 4 of CN1. The output contacts (18a, 18b) of relay RL2 are connected directly to terminal 5 and 6 of CN1. These are dry contacts and do not source any power.

In one implementation, the micro-controller IC2 is a low power 8 bit single chip micro-controller. The chip has a 512×14 read only memory (ROM), 80 bytes if random access memory (RAM), 13 individually selectable I/O pins, and an eight bit counter which can count external events. Special on-chip features include a programmable reference as discussed above, and two independent configurable analog comparators. Other special features include on-chip power on reset, power up timer, oscillator startup timer, brown out protection, and a watch dog timer.

In one implementation, as discussed above, the oscillator is the RC configuration with a 10 kΩresistor and 100 pF capacitor to create an oscillator frequency of approximately 600 kHz. The power line frequency is connected to the 8 bit counter input. The counter can cause an interrupt when the count exceeds 255. This interrupt is used to establish a 1 second main loop time and count seconds by resetting the counter to 195 (255–60) every interrupt. Once a second, a determination of the logic value of the analog input is made, and then appropriate state logic and timers act to control the output.

Referring again to FIG. 1, the switch 15 selects one of the timer and non-timer modes. In one implementation, if the switch 15 is in the non-timer position, the outputs 17a, 17b and 18a, 18b open when the current exceeds 5.5 amps and remain open until the current drops below 4.5 amps. Similarly, referring to FIG. 2, when the current sensed at CN2 exceeds 5.5 amps, the relays RL1, RL2 open and remain open until the current drops below 4.5 amps.

Figure 3:
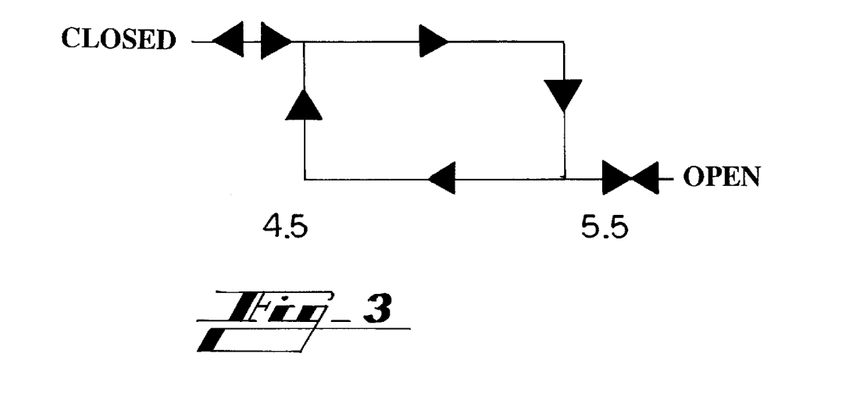
FIG. 3 is a current hysteresis loop.

FIG. 3 illustrates a hysteresis depicting the state of the outputs 17a, 17b and 18a, 18b in the timer mode.

When the switch 15 is in the timer position 15a, the PLD 10 operates in the timer mode. The purpose of the timer mode is to cycle the controlled loads, connected to outputs 17a, 17b and 18a, 18b, on and off when the input current is higher than a threshold. It is preferable to keep the outputs on for a total minimum of 20 minutes out of every thirty minutes. When the PLD 10 is powered up, the outputs 17a, 17b and 18a, 18b open for 5 minutes to protect compressor loads, for example. The outputs 17a, 17b and 18a, 18b close for at least 10 minutes. If the input current does not continuously exceed the threshold for the last 5 minutes, the outputs 17a, 17b and 18a, 18b remain closed. The outputs 17a, 17b, 18a, 18b remain closed until either the power is turned off and back on, or until the input current exceeds the threshold for 5 minutes continuously. If the input current exceeds the threshold continuously for 5 minutes, then the outputs 17a, 17b and 18a, 18b remain open for 5 minutes and close again for at least 10 minutes. For input current continuously exceeding the threshold, this timing provides 2 cycles of 5 minutes off and 10 minutes on for a total of 10 minutes off and 20 minutes on.

Figure 4:
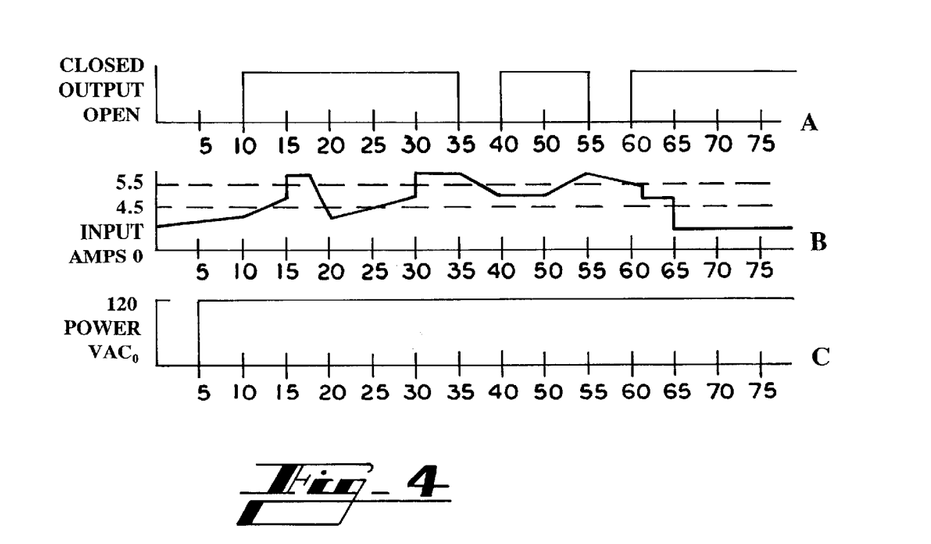
FIG. 4 illustrates a combined graph of output, current input and power versus time.

FIG. 4 illustrates three graphs, output versus time, input current versus time and power (VAC) versus time. In an implementation, graph B represents the current pulled during typical daily appliance use in a home or business. The outputs in graph A may represent an additional load such as a microwave oven. In another implementation, the graphs A, B, C may represent a larger scale distribution system in a town or a city.

Referring to graph C, the PLD 10 is powered up at 5 minutes. In graph B, an input current remains below the 5.5 amp threshold until 15 minutes. In graph A, the output starts open but closes at 10 minutes. At 19 minutes, the current drops below 4.5 amps in graph B so the output remains closed in graph A because the input was not above the threshold for at least 5 minutes continuously. The input current remains below 5.5 amps until 30 minutes. The current remains above 4.5 amps until 65 minutes, so the output cycles off for 5 minutes in graph A and on for 10 minutes as long as the current remains above 4.5 amps. Anytime the PLD 10 is powered up, the cycle begins with the outputs 17a, 17b and 18a, 18b for 5 minutes and then closed for at least 10 minutes.

Typically, the two outputs 17a, 17b, 18a, 18b are dry contact normally open relays (RL1, RL2 in FIG. 2), which remain open when power is not supplied to the PLD 10. This open state keeps the controlled devices turned off if the PLD 10 loses power and cannot control the outputs 17a, 17b and 18a, 18b.

Software Control of the Peak Load Distributor

As discussed above, the micro-controller IC2 contains software instructions, typically programmed into internal firmware. Typically, the PLD 10 is powered on after downtime or after being reset by an internal power up timer or a watch dog timer (both not shown) in a situation where the PLD 10 has timed out or been shut down to protect the PLD 10 or attached loads. The software in the PLD 10 contains a power up reset vector which is the address of the first instruction processed by the micro-controller IC2 after being reset by either the power up timer of the watch dog timer functions.

The software in the micro-controller IC2 contains an initialization routine is which includes setting up inputs and outputs, initializing the counter and counter registers, initializing interrupts and presetting a power up flag to keep the output off for the first 5 minutes, as well as additional configuration routines.

Figure 5:
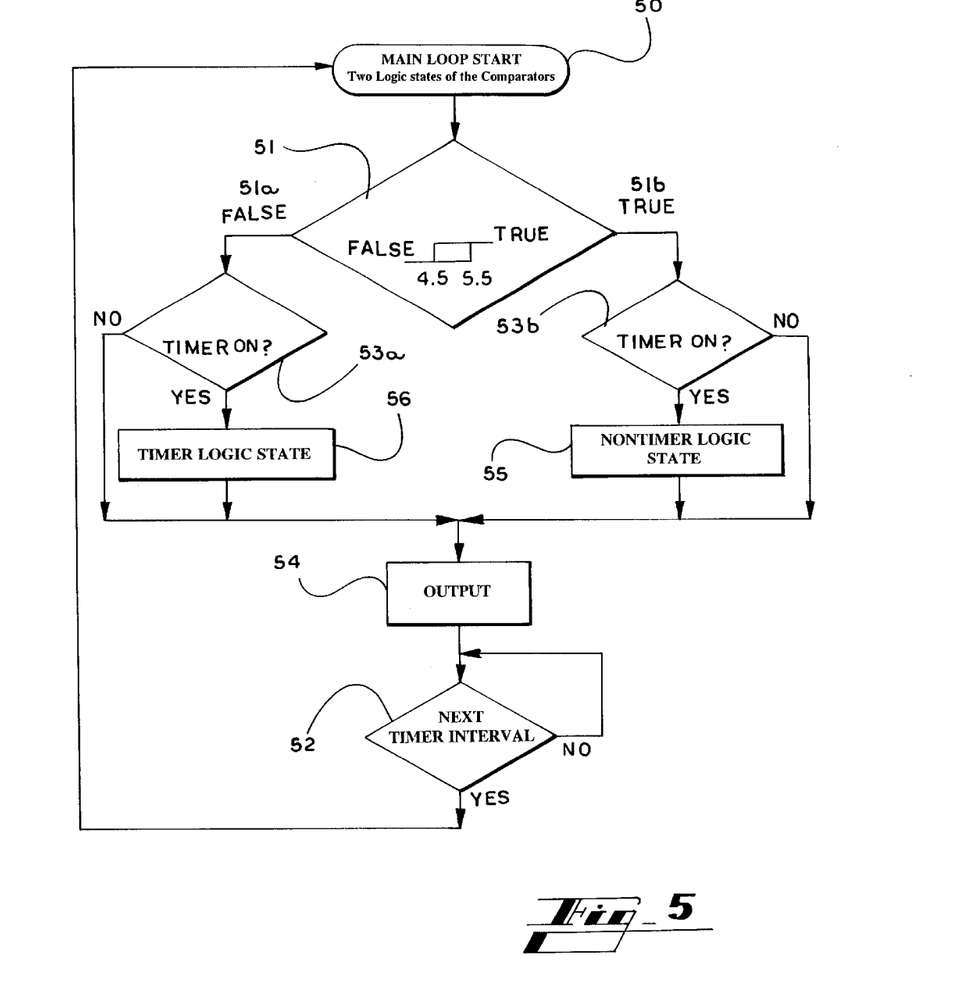
FIG. 5 illustrates a flow chart of an implementation of micro-controller logic.

FIG. 5 illustrates an implementation of a flow chart for a main loop operation of the PLD 10. The main loop 50 is the start of the program loop which contains all of the processing and tests which make up the system function. At the beginning of each time interval, typically one second, the main loop 50 begins again, starting with an analog comparison and hysteresis 51 and ending with waiting for the next timer interval 52.

In the analog and comparison and hysteresis 51, since the internal analogs comparators of micro-controller IC2 do not have a built-in hysteresis, a software equivalent is constructed using the internal programmable reference voltage, which is first set to a voltage corresponding to 4.5 amps, typically 3.15 volts.

Figures 6, 7:
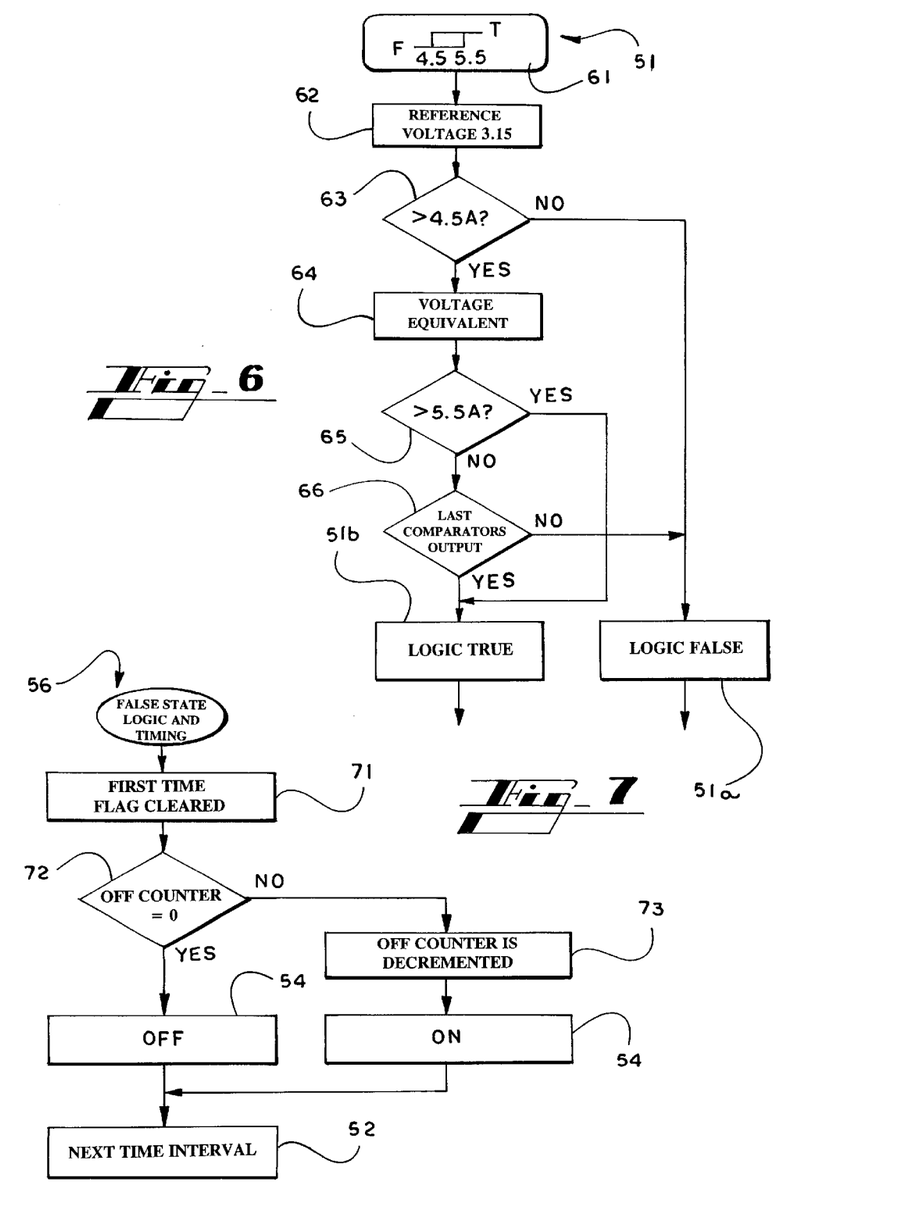
FIG. 6 illustrates a flow chart for logic state and timing.
FIG. 7 illustrates another flow chart for logic state and timing.

FIG. 6 illustrates the comparison and hysteresis 51 of FIG. 5. As a starting point, first reference voltage is set 62 to a value (e.g., 3.15 volts) corresponding to a current of 4.5 amps. The input current is checked to determine 63 if it is above 4.5 amps. If the input current is less than 4.5 amps at 63, then the logic is set 51a to false. If the input current is greater than 4.5 amps at 63, then the reference is set 64 to the voltage equivalent to 5.5 amps, typically 3.85 volts. The input current is checked to determine 65 if it is above 5.5 amps. If the input current is above 5.5 amps at 65, then the logic is set 51b to true. If the input current is not above 5.5 amps at 65, it is then determined 66 if the last comparators output was true. If the last comparators output was true at 66 then the logic output remains true at 51b. If the last comparators output was not true at 66 then the logic output is set 51a to false.

Referring again to FIG. 5, based upon the logic state of the comparators, there are two logic branches ending up at one of two logic states 51a, 51b. The switch 15 is tested 53a, 53b to determine whether the timer mode or the non-timer operation is selected. If the timer mode is not selected at 53a, 53b, then the output logic state of the comparators is used to directly control the output at 54. If the timer mode is selected at 53a, 53b, the output is controlled by the internal software counters and flags. In one embodiment, the internal counters and flags are located in general purpose RAM and is under the timing algorithm program control. In general, the true counter is incremented every second when a true logic output of the comparators occurs. The off counter is pre-loaded for 300 seconds (5 minutes) and the on counter is pre-loaded for 600 seconds (10 minutes) the first time the true counter exceeds 300 seconds (5 minutes).

FIG. 7 illustrates the false state logic and timing 56 of FIG. 5. The software true counters and first time flag are cleared 71. It is then determined 72 whether the off counter is equal to zero. If the off counter is equal to zero at 72, then the output is set 54 off. If the off counter is not equal to zero at 72, then the off counter is decremented 73 and the output is set 54 on.

Figure 8:
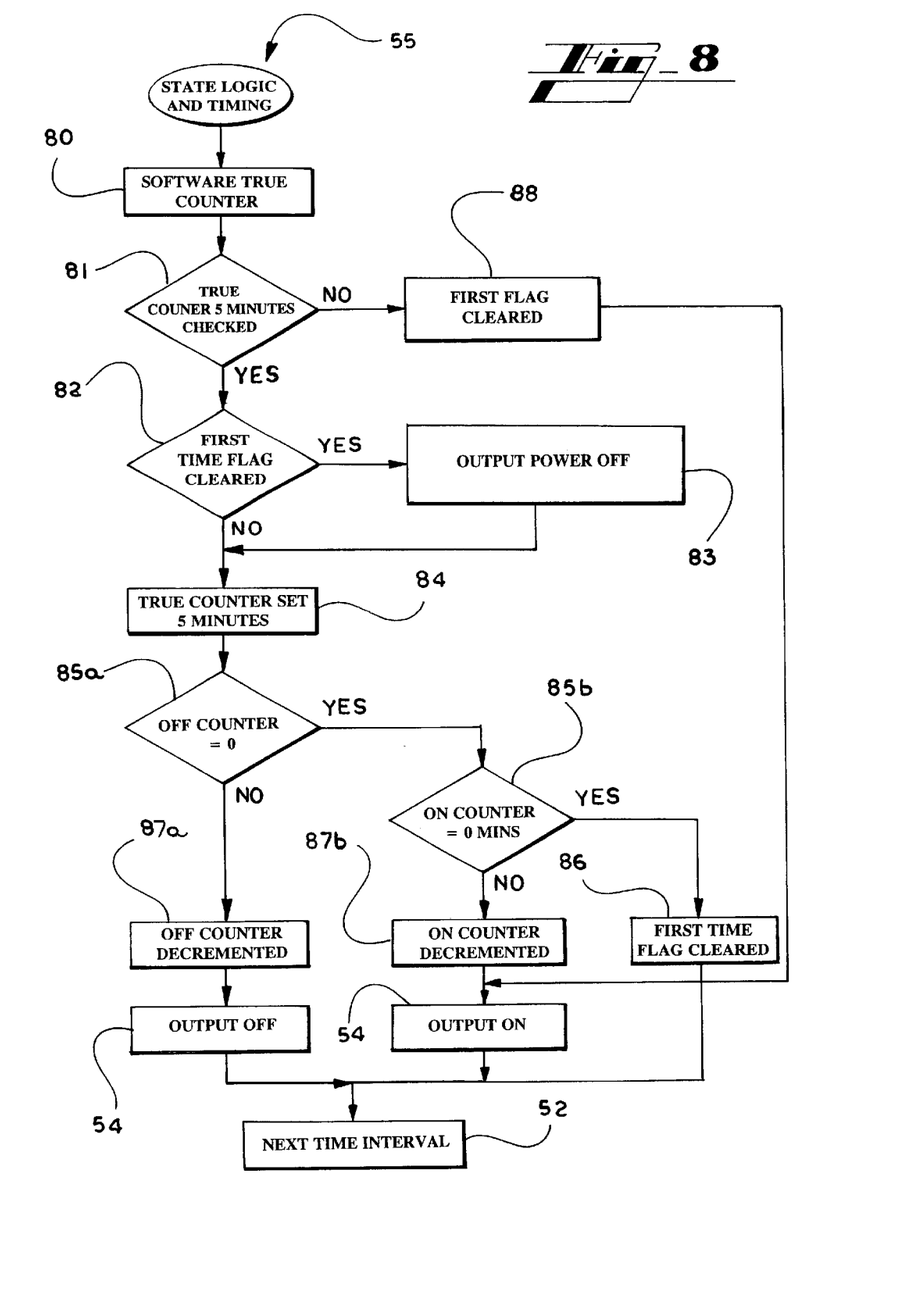
FIG. 8 illustrates still another flow chart for logic state and timing.

FIG. 8 illustrates the state logic and timing 55 of FIG. 5. The software true counter is incremented 80. If the true counter is greater than 5 minutes 81 then it is checked if the first time flag is clear 82. If the first time flag is clear at 82, then the output power is set 83 off. In addition, at 83, the off counter is set to 5 minutes and the on counter is set to 10 minutes. The first time flag is then also set at 83. If, at 82, the first time flag is not clear, the true counter is set 84 to 5 minutes. It is then determined 85*a* if the off counter is equal to 0 minutes. If it is equal to 0 minutes at 85*a*, then it is determined 85*b* if the on counter is equal to 0 minutes. If the on counter is equal to 0 minutes at 85*b* then the first time flag is cleared 86. If, at 85*a*, the off counter is not equal to 0 minutes, then the off counter is decremented 87*a* and the output is set 54 off. If, at 85*b*, the on counter is not equal to 0 minutes, the on counter is decremented 87*b* and the output is set 54 on.

Referring still to FIG. 8, if at 81, the true counter is not greater than 5 minutes, the first time flag is cleared 88 and the output is set 54 on.

The following table is a summary of the logic and timing for true and false as discussed with respect to FIGS. 7 and 8.

TABLE 1

| Logic Output | True Counter | First Time Flag | Off Counter | On Counter | Output |
|---|---|---|---|---|---|
| TRUE | < % Minutes | X | X | X | ON |
| TRUE | >/= 5 minutes | CLEAR | 300 | 600 | OFF |
| TRUE | >/= 5 minutes | SET | >0 | >0 | OFF |
| TRUE | >/= 5 minutes | SET | =0 | >0 | ON |
| TRUE | >/= 5 minutes | SET | =0 | =0 | ON* |
| FALSE | CLEARED | CLEARED | >0 | X | ON |
| FALSE | CLEARED | CLEARED | =0 | X | OFF |

X-Don't Care
*But clear first time flag

Referring to FIGS. 5, 6, 7 and 8, after the physical output is turned on or off at 54, the program waits for the 60 Hz counter to reach 60, or one second. The program then branches back into the main loop 50 (FIG. 5).

The software techniques and methods discussed above can be implemented in digital electronic circuitry, or in computer hardware, firmware (as discussed), software, or in combinations of them. Apparatus may be implemented in a computer program product tangibly embodied in a machine-readable storage device for execution by a programmable processor; and methods may be performed by a programmable processor executing a program of instructions to perform functions by operating on input data and generating output. Further embodiments may advantageously be implemented in one or more computer programs that are executable on a programmable system including at least one programmable processor coupled to receive data and instructions from, and transmit data and instructions, to a data storage system, at least one input device, and at least one output device. Each computer program may be implemented in a high level procedural or object-oriented programming language, or in assembly or machine language, which can be compiled or interpreted. Suitable processors include, by way of example, both general and special purpose microprocessors generally, a processor receives instructions and data from read-only memory and or RAM. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed application specific integrated circuits (ASICs).

A number of embodiments have been described. Nevertheless, is will be understood that various modifications may be made without departing from the spirit and scope of the invention. Several examples are now illustrated.

In an electric distribution system having numerous circuits, the PLD 10 can be used to monitor one load to defer a second and third load. Furthermore, the second and third loads can be used to defer a fourth and fifth load. Such cascaded loads can continue until a maximum desired efficiency of power distribution is attained.

The PLD 10 may also be connected to a remote meter reading and communications system such that a power company can operate the PLD 10 remotely. Such remote operations can be implemented in a series of computer systems and software instructions discussed above.

In another example, the PLD 10 can be implemented into an electric distribution system including a micro-turbine generator supplying numerous contactors connected to a standard circuit panel. The PLD 10 can be connected to a single power supply which can automatically interrupt the system, at predetermined current levels or "trigger" points, or with the absence of current caused by outages in a power grid.

In a further example, the PLD 10 can be implemented in an electric distribution system in which several thousand loads can be connected to a PLD 10 or system of PLDs 10. The PLD or PLDs 10 can be encoded with precise staggered delay algorithms. In a situation where the loafs have been denied power, such as in a power outage, large transients occur when a breaker or recloser restores power to the loads. This restoration of power can be coincidental. The PLD or system of PLDs 10 can be used to delay the distribution of the large transients in a staggered manner. Such an implementation can dramatically decrease peak current required when restoring power after an outage of a central grid power distribution system. Thus, by avoiding the simultaneous synchronization of normal diverse loads, the power company is able to restore the distribution supply without recurring outages from coincidental peak demands of the normally diversified loads. The consumer benefits by avoiding penalty charges for high peak startup demand caused by the outage.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A power distributor, comprising:
   a current sensor having a load input and a sensor output;
   a control unit connected to the current sensor, the control unit comprising;
      a current sensor input connected to the sensor output;
      control outputs adapted to respond to a current in the current sensor;
      a control switch connected to each of the control outputs; and
      a microcontroller electrically coupled to the current sensor input and the control outputs, wherein the microcontroller includes a timer connected to a timer switch, and a memory, the microcontroller, the memory having a non-timer process and a timer process,
   wherein the non-timer process comprises instructions to cut-off power to the control outputs when a current in the current sensor exceeds a first threshold, and to distribute power to the control outputs when the current in the current sensor drops below a second threshold, and
   wherein the timer process comprises instructions to distribute power to the outputs so long as the current in the current sensor remains below the first threshold, to continue distributing power to the control outputs if the current in the current sensor exceeds the first threshold for a first time interval, and continuously alternating the power to the outputs on for a first predetermined time and off for a second predetermined time if the current remains in excess of the first threshold for a second time interval, until the currant in the current sensor falls below the second threshold.

2. The power distributor as claimed in claim 1 wherein the current sensor is a current transformer.

3. The power distributor as claimed in claim 1 wherein the current sensor includes an input adapted to receive a plurality of conductors, each of the plurality of conductors having a unique current level.

4. The power distributor as claimed in claim 1 wherein the timer is based on a line frequency.

5. A method of controlling power in a power distribution system, comprising:

provided a current in a current sensor, the current having a plurality of threshold values;

providing power or a plurality of loads, each load having a current;

monitoring the threshold values of the current in the current sensor; and based on tile threshold values of the current in the current sensor, distributing power to the outputs so long as the current in the current sensor remains below a first threshold, continuing to distribute power to the control outputs if the current in the current sensor exceeds the first threshold for a first time interval, and continuously alternating the power to the outputs on for a first predetermined time and off for a second predetermined time if the current remains in excess of the first threshold for a second time interval, until the current in the current sensor falls below a second threshold.

6. An electric distribution system, comprising:

a plurality of circuits, each having a plurality of loads;

a peak load distributor, comprising:

a current sensor having a load input and a sensor output;

a control unit connected to the current sensor, the control unit comprising:

a current sensor input connected to the sensor output;

control outputs, each connected to a respective one of the plurality of loads, the control outputs adapted to respond to a current in the current sensor;

a control switch connected to each of the control outputs; and a microcontroller electrically coupled to the current sensor input and the control outputs, wherein the microcontroller includes a timer connected to a timer switch, and a memory, the microcontroller, the memory having a non-timer process and a timer process, wherein the non-timer process comprises instructions to cut-off power to the control outputs when a current in the current sensor exceeds a first threshold, and to distribute power to the control outputs when the current in the current sensor drops below a second threshold, wherein the timer process comprises instructions to distribute power to the outputs so long as the current in the current sensor remains below the first threshold, to continue distributing power to the control outputs if the current in the current sensor exceeds the first threshold for a first time interval, and continuously alternating the power to the outputs on for a first predetermined time and off for a second predetermined time if the current remains in excess of the first threshold for a second time interval, until the current in the current sensor falls below the second threshold.

7. The electric distribution system as claimed in claim 6 further comprising a remote meter and communications module connected to the peak load distributor.

* * * * *